Figure 1:
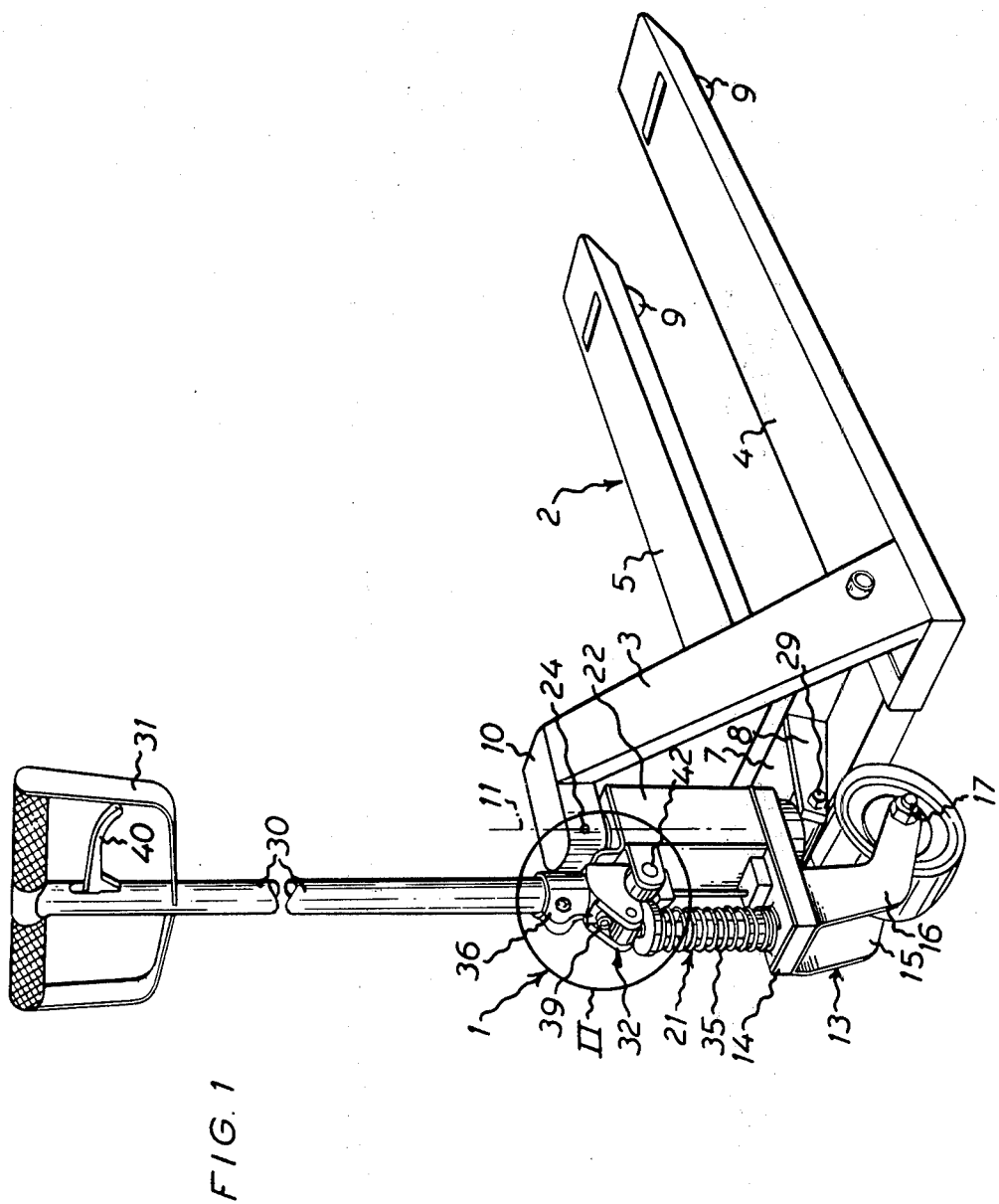

United States Patent [19]
Larsson et al.

[11] 3,982,767
[45] Sept. 28, 1976

[54] HAND-OPERATED PALLET TRUCK

[75] Inventors: Hans Gustav Ingvar Larsson; Sven Gunnar Harald Stjärnovist, both of Angelholm, Sweden

[73] Assignee: Marco Materialhantering AB, Sweden

[22] Filed: June 13, 1975

[21] Appl. No.: 586,816

[30] Foreign Application Priority Data
July 1, 1974  Sweden .............................. 7408636

[52] U.S. Cl. ............................. 280/43.12; 254/2 C
[51] Int. Cl.² ........................................... B66F 5/04
[58] Field of Search ..................... 280/43.12, 43.17; 254/2 R, 2 C

[56] References Cited
UNITED STATES PATENTS
3,843,147  10/1974  Fredricson ...................... 280/43.12

FOREIGN PATENTS OR APPLICATIONS
1,056,722  3/1954  France ............................ 280/43.12
130,869  2/1951  Sweden ............................. 254/2 C Primary Examiner—Robert R. Song
Assistant Examiner—Michael J. Forman
Attorney, Agent, or Firm—Bucknam and Archer

[57] ABSTRACT

A hand-operated pallet truck having a single steerable ground wheel the axis of which intersects a vertical axis about which a combined wheel and jack assembly of the truck is rotatable.

8 Claims, 4 Drawing Figures

HAND-OPERATED PALLET TRUCK

The invention relates to a hand-operated pallet truck of the type having a combined wheel and jack assembly rotatable about a vertical axis and movable on one steerable wheel, a lift fork associated with and raisable and lowerable relative to said assembly by means of a hydraulic jack, and support wheels raisable and lowerable in said lift fork, said wheel and jack assembly carrying for the manipulation of the truck a pulling bar which also constitutes a pumping bar for raising the jack and which to this end is pivotally mounted on said wheel and jack assembly and has an operating means for lowering the jack.

Hand-operated pallet trucks of the type indicated are well-known and have been widely used within many different fields mainly for internal conveyance of articles weighing up to a couple of metric tons. These trucks are designed so as to be stable, reliable in operation and have a relatively long life. This implies that they are often given unnecessarily heavy dimensions with ensuing rather high costs of manufacture.

The main object of the invention is to provide a hand-operated pallet truck less expensive in manufacture than conventional pallet trucks, while retaining the stability, reliable function and long life of the pallet truck. The most expensive and complicated unit of the truck is the wheel and jack assembly with its bearing, hydraulic equipment and wheel suspension. Thus, the greatest attention should be given to said unit of the truck for a reduction of the costs of manufacture.

For attaining said main object, the invention is characterised in that the steerable wheel is mounted on a wheel fork which is connected to a plate associated with the wheel and jack assembly and carrying the jack, the prongs of said wheel fork extending substantially obliquely downwardly and rearwardly so that the axis of the steerable wheel substantially intersects the vertical axis about which the wheel and jack assembly is rotatable.

Figure 3:
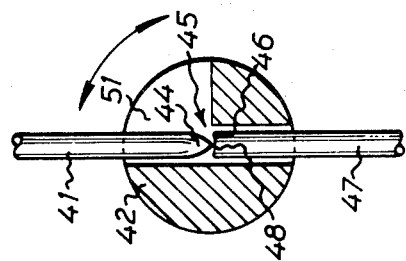
Figure 2:
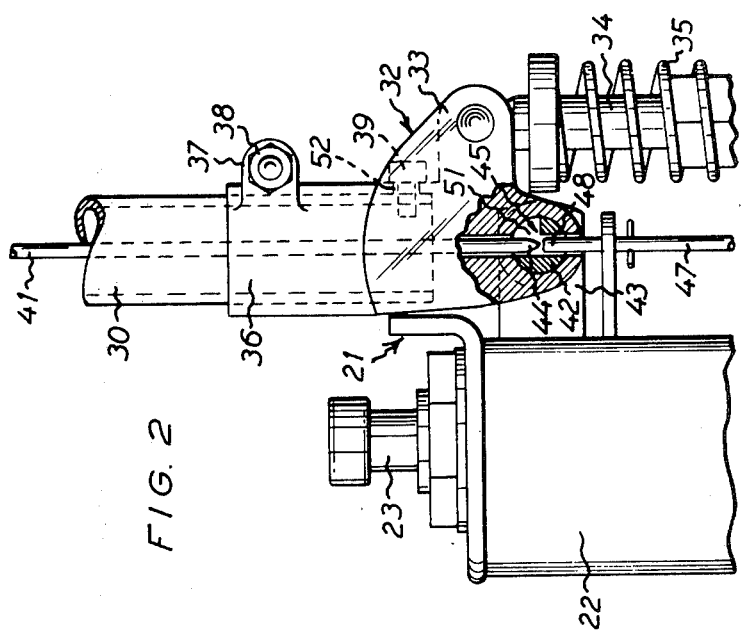

A preferred embodiment of the invention is more fully described hereinbelow and with reference to the accompanying drawings in which:

FIG. 1 shows a perspective view taken obliquely from in front, of the entire hand-operated pallet truck according to the invention;

FIG. 2 in side elevation and partly in section shows a magnification of the area inscribed in the circle II in FIG. 1;

FIG. 3 shows a detail in FIG. 2 on a larger scale; and

Figure 4:
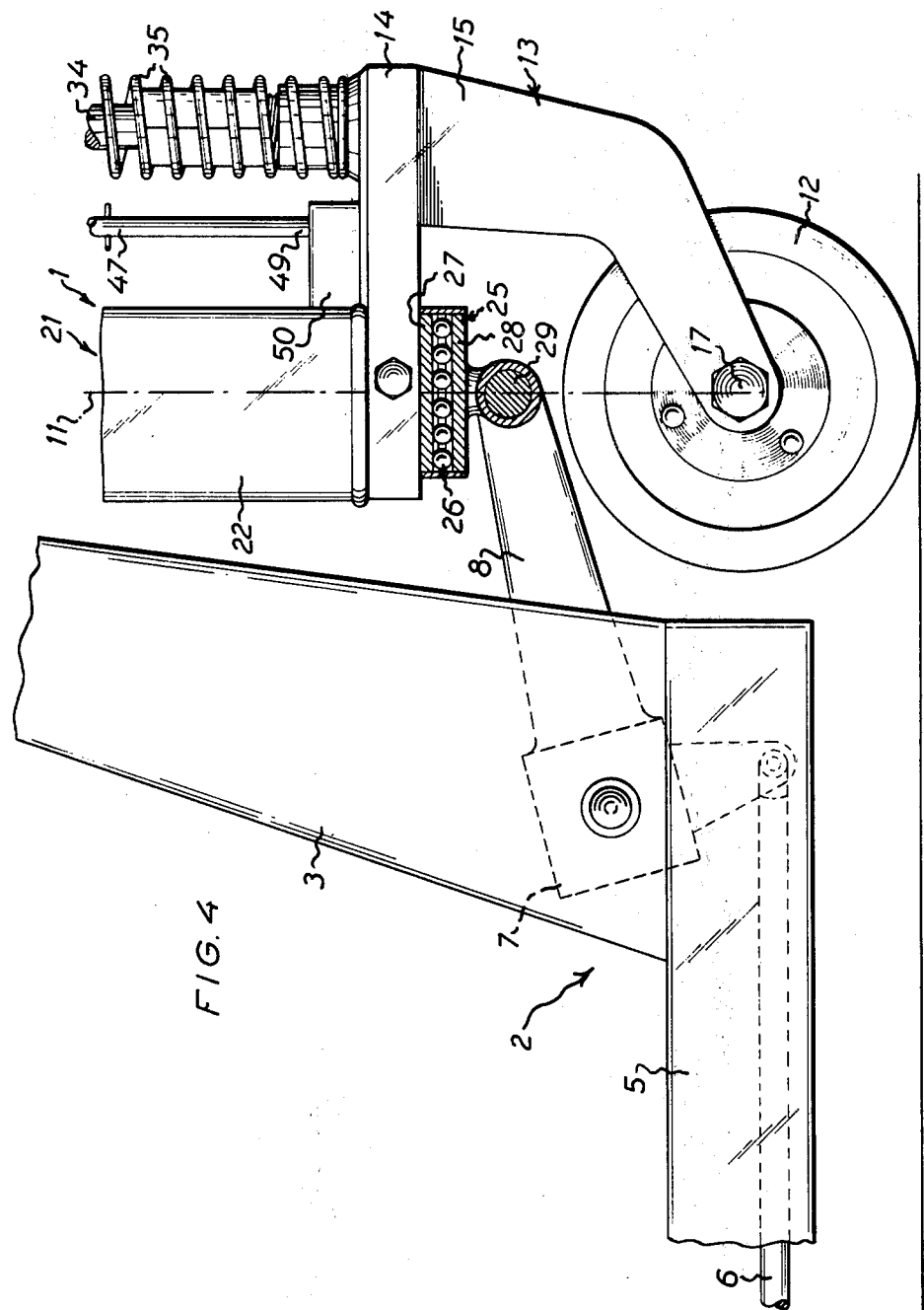

FIG. 4 in side elevation shows part of the front of the truck in FIG. 1.

The principal component parts of the pallet truck according to the invention illustrated in the drawings are a wheel and jack assembly 1, and a lift fork 2 associated therewith.

Since the lift fork 2 does not constitute any part of the invention and is of conventional design, it will be described only very briefly in order that its association with the wheel and jack assembly shall be clearly apparent.

The lift fork 2 comprises an end wall 3 which is fixedly connected at its lower end to two fork prongs 4, 5 extending from said end wall and carrying at their outer free ends one or more support rollers or wheels 9 which can be raised and lowered in a known manner by means of a movement transmitting mechanism 6, 7, 8.

The movement transmitting mechanism comprises a bar 6 guided in the respective fork prong 4, 5 and connected at its one end to a wheel fork (not shown) accommodating the respective support wheel 9, and at its other end to a tube 7 rotatably mounted in the end wall 3 and having lever arms 8 which are connected to the wheel and jack assembly in a manner described hereinbelow. The end wall 3 of the lift fork 2 is fixedly connected at its upper end to the headpiece 10 of the end wall 3. Said headpiece is connected to the wheel and jack assembly in a manner likewise to be described hereinbelow.

The wheel and jack assembly 1 is so mounted on the lift fork 2 via the lever arms 8 and headpiece 10 thereof that it is rotatable about a vertical axis 11 and is movable, supported by a steerable wheel 12. According to the invention, the steerable wheel 12 is mounted to a wheel fork 13 which is fixed to a rectangular plate 14 associated with the wheel and jack assembly 1. The prongs 15, 16 of said wheel fork 13 accommodate the steerable wheel 12 between them and extend obliquely downwardly and rearwardly in the manner illustrated in FIGS. 1 and 4 so that the axis 12 of the steerable wheel 17 substantially intersects the vertical axis 11 about which the wheel and jack assembly 1 is rotatable. The wheel fork 13 is made of an integral piece of metal and can be pressed, bent or worked into the shape illustrated in any other suitable manner. It is also possible to make the wheel fork 13 integral with plate 14.

To make the steering geometry of the pallet truck as favourable as possible, that is, to permit it to be easily driven in both directions, the steerable wheel 12 is aligned with the vertical axis 11 about which the wheel and jack assembly 1 is rotatable.

A hydraulic jack 21 is fixedly mounted on the upper side of the rectangular plate 14 and has for its object to raise and lower the lift fork 2 relative to the wheel and jack assembly 1 and the support wheels 9. The jack 21 comprises a cylinder 22 of rectangular cross-section, the piston rod of which 23 is detachably connected by means of a bolt 24 to the headpiece 10 of the end wall 3 and actuates said headpiece and thus the entire lift fork 2 for the raising and lowering thereof. To permit a slight rotation of the wheel and jack assembly 1 relative to the lift fork 2, a ball bearing ball (not shown) is located between the piston rod 23 and the headpiece 10, while a thrust bearing 25 with balls 26 is provided between the underside of the plate 14 and the lever arms 8 associated with the movement transmitting mechanism for the support wheels 9 to reduce friction. The thrust bearing 25 has a portion 27 which is fixedly connected to the plate 14, and a portion 28 which is pivotally connected to the lever arms 8 by means of a bolt 29.

For the manipulation of the pallet truck the wheel and jack assembly 1 thereof is equipped in a known manner with a pulling bar 30 having a handle 31, for example of stirrup-shape. The pulling bar 30 also constitutes the pumping bar for raising the jack 21 via a bracket 32 with a lever arm 33 and a pump piston 34 with return spring 35, and is pivotally mounted on the wheel and jack assembly with the aid of the bracket 32. Said bracket is pivoted to the wheel and jack assembly 1 by means of a joint bolt 42 which is non-rotatably attached to lugs 43 associated with the wheel and jack assembly 1 or more exactly with the cylinder 22 of the jack 21. Thus the bracket 32 and also the pulling bar 30 can be pivoted or rotated about the joint bolt 42 for manipulating the truck and elevating the jack 21 and thus the lift fork 2.

To reduce the space required for the storage and transportation of the pallet truck the pulling bar 30 is detachable from the bracket 32. To this end, the bracket 32 has a recess 36 for accommodating and fixing the pulling bar. A slot (not shown) extends from the recess 36 to the outer side of the bracket 32, and on either side of the slot there are provided lugs 37 for taking up a tension bolt 38 which has for its task to clamp the pulling bar 30 in the bracket. A lock bolt 39 is screwed into the bracket 32 from the outer side thereof and extends into a hole 52 in the wall of the pulling bar 30. The lock bolt 39 has for its object to fix the pulling bar in correct position.

The pulling bar 30 also has an operating means for lowering the jack 21. This operating means comprises a manually operable operating lever 40 located at the upper end of the pulling bar 30 in the region of the handle 31. An operating rod 41 is passed through the pulling bar 30 and has its upper end pivoted to the lever 40. The operating rod 41 extends at its lower end 44 into a recess 45 extending transversely of and through the joint bolt 42, the end 44 of the rod terminating in the region of the axis 46 of the joint bolt 42. A valve rod 47 extends with its one end 48 into the recess 45 of the joint bolt 42 from the direction opposite to the direction of insertion of the operating rod 41 to bear in end-to-end relationship against the lower end 44 of the operating rod. This will provide a hinge connection between the operating rod 41 and the valve rod 47 in the region of the axis 46 of the joint bolt 42 so that the pulling bar 30 can be swung in the manner indicated in the foregoing without being obstructed by the parts associated with the operating means. The valve rod 47 has its other end 49 connected to a valve 50 of the jack 21, said valve serving as an outlet valve to let hydraulic oil escape from the cylinder 22 for lowering the jack.

The lower end 44 of the operating rod 41, which terminates in the region of the axis 46 of the joint bolt 42 is pointed in order to bear in point-suspension fashion against the upper end 48 of the valve rod 47.

The recess 45 of the joint bolt 42 is sector-shaped, as shown at 51 in FIGS. 2 and 3, to permit swinging the pulling rod 30 and the operating rod 41 passed therethrough in the abovementioned manner in relation to the joint bolt.

The above embodiment of the invention was described for purposes of illustration rather than limitation. All possible variations and modifications of the invention are understood as being included within the scope of the appended claims.

What we claim and desire to secure by Letters Patent is:

1. A hand-operated truck having a combined wheel and jack assembly rotatable about a vertical axis and movable on a steerable wheel, a lift fork associated with and raisable and lowerable relative to said assembly by means of a hydraulic jack, support wheels raisable and lowerable in said lift fork, said wheel and jack assembly carrying a bar for pulling the truck, said bar comprising pumping means for raising the jack, said bar being pivotally mounted on the wheel and jack assembly, said bar having operating means for lowering the jack, said jack being mounted on a plate, said steerable wheel being mounted on a wheel fork which is connected to said plate the prongs of said wheel fork extending substantially obliquely downwardly and rearwardly, the axis of the steerable wheel substantially intersecting the vertical axis about which said wheel and jack assembly is rotatable.

2. A hand-operated pallet truck as defined in claim 1, wherein the wheel fork is made in an integral piece of pressed or bent metal.

3. A hand-operated pallet truck as defined in claim 1, wherein said steerable wheel is aligned with the vertical axis of rotation.

4. A hand-operated pallet truck as defined in claim 1, wherein the bar which pulls the truck is detachably mounted in a bracket hingedly mounted on the wheel and jack assembly by means of a joint bolt, said bracket having a recess for accommodating and clamping the bar and a lever arm for actuating the pump piston of the jack.

5. A hand-operated pallet truck as defined in claim 4, wherein the joint bolt is non-rotatably mounted on lugs associated with the jack.

6. A hand-operated pallet truck as defined in claim 4 wherein the operating means for lowering the jack comprises an operating lever located at the upper free end of the bar, which pulls the truck, an operating rod associated with said operating lever and passed through said bar, said operating rod extending into a recess passing transversely through the joint bolt and terminating in the region of the axis of the joint bolt, and a valve rod which has one end extending into the recess of the joint bolt from the direction opposite to the operating rod to bear in end-to-end relationship against and be acted upon by the operating rod, and the other end connected to a valve associated with the jack.

7. A hand-operated pallet truck as defined in claim 6, characterised in that the end of the operating rod terminating in the region of the axis of the joint bolt is pointed and bears in point-suspension fashion against the facing end of the valve rod.

8. A hand-operated pallet truck as defined in claim 6, characterised in that the recess of the joint bolt is sectorshaped to permit pivoting said bar and the operating rod extending therethrough relative to the joint bolt.

* * * * *